3,148,119
ANTIBIOTIC PRODUCTS AND PROCESS
Koppaka V. Rao, Pine Brook, William S. Marsh, Wanaque, and Donald W. Renn, New Milford, N.J., assignors to Chas. Pfizer & Co., Inc., New York, N.Y., a corporation of Delaware
Filed June 13, 1952, Ser. No. 202,145
8 Claims. (Cl. 167—65)

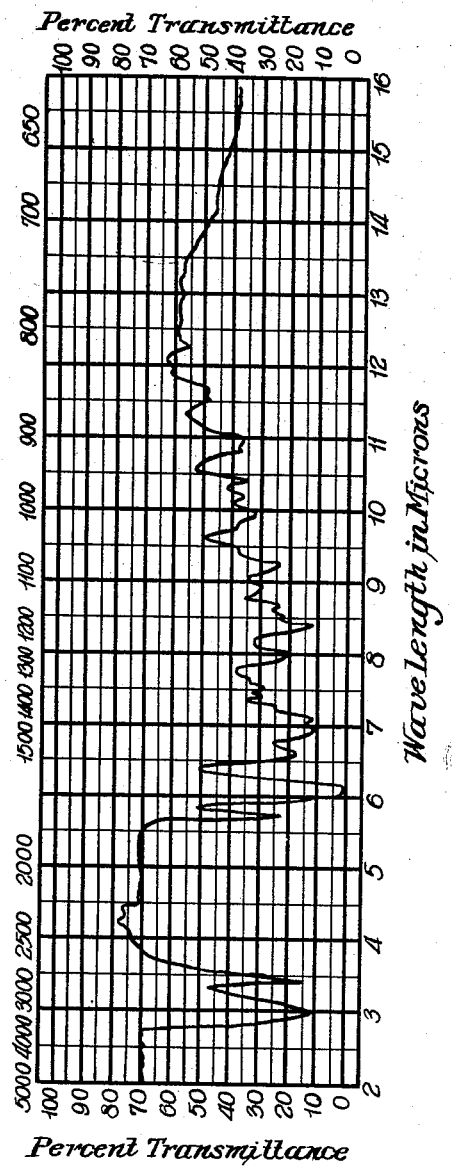

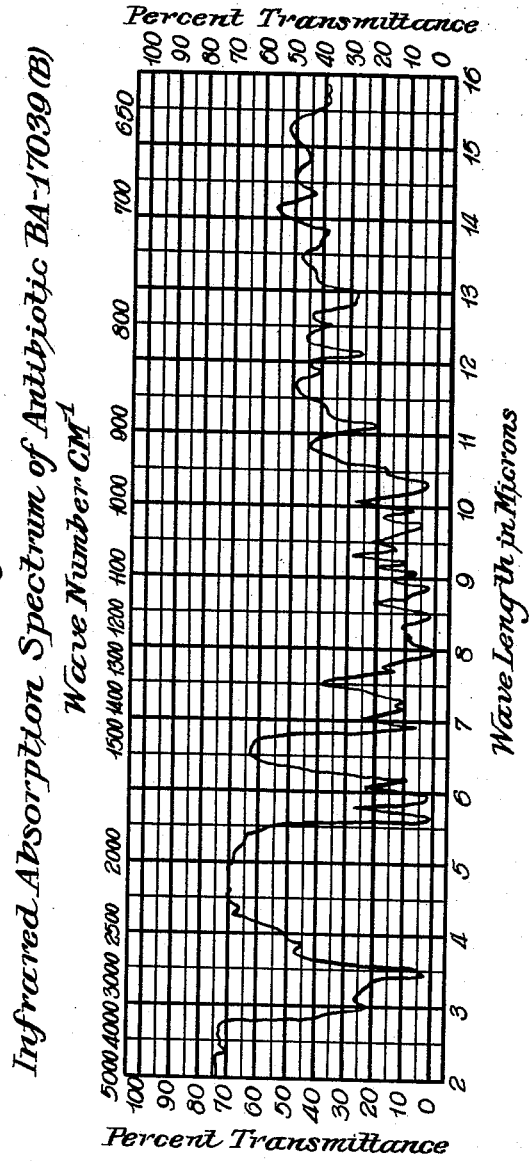

This invention relates to the cultivation under controlled conditions of a species of Streptomyces, to the biologically active substances produced thereby, and to methods for the recovery and concentration from crude solutions, including fermentation broths, of these new and useful substances. More particularly, this invention relates to the antibiotic complex BA–17039 (ABC) and to the three biologically active components isolated therefrom in both the crude and purified forms and to the methods for the preparation, isolation and separation of these substances from one another.

The antibiotic complex and the three active principles designated as BA–17039 (A), BA–17039 (B) and BA–17039 (C) isolated therefrom each possess useful antitumor activity or useful antimicrobial activity against a variety of organisms. This permits their application in therapeutics, veterinary medicine and agriculture. The new antibiotic complex may be used in industrial fermentations to prevent contamination by sensitive organisms. The complex, in addition, is useful for separating mixtures of microorganisms for medical diagnostic and research purposes. Furthermore, the antibiotic complex shows activity against human carcinoma cells in vitro in tissue cultures and in vivo in animals.

The organism which is employed in the valuable process of the present invention was obtained from a soil sample collected in Japan, and isolated on an agar formulation of the following composition:

| | Gm./liter. |
|---|---|
| Dextrose | 10 |
| Phytone | 10 |
| Sea salt | 5 |
| Yeast extract | 2 |
| Agar | 15 |
| Dist. $H_2O$ to volume. Initial pH of agar 6.6 | |

A sample of one strain of the species has been deposited in the American Type Culture Collection in Washington, D.C., and assigned ATCC No. 14697. It is identified in the records of Chas. Pfizer & Co., Inc. as Isolate BA–17039. The isolated culture was identified by Dr. J. B. Routien as a member of the species Streptomyces longisporus subsp. griseus and the cultural characteristics are set forth in Table 1.

TABLE 1

Cultural Characteristics of BA–17039

| Medium | Growth | Aerial mycelium and spores | Soluble pigment | Remarks |
|---|---|---|---|---|
| Glucose-asparagine agar. | Moderate | Moderate growth; gray-lavendar. | Light brown | Reverse grayish-brown. Spore chains straight, loops, hook and spirals; in clusters of much branched hyphae. |
| Synthetic agar | Very poor to almost lacking. | | | Growth colorless. |
| Nutrient agar | Poor | Scanty; light gray | Lacking | Vegetative mycelium and reverse colorless. |
| Glucose agar | Moderate | Lacking | Very faint brownish yellow. | Vegetative mycelium dull yellowish gray; reverse colorless. |
| Skimmed milk | Moderate in colorless ring. | do | Slight pale salmon | No coagulation or hydrolysis; pH changed from 6.7 to 7.2. |
| Potato plug | Poor; very thin layer. | do | Gray | Vegetative mycelium colorless. |
| Cellulose | No growth | | | |
| Gelatin plates | Moderate | Moderate growth gray. | Lacking | Reverse gray to nearly black; good liquefaction. |
| Starch plates | Poor, thin | Lacking | do | Culture colorless; no hydrolysis. |
| Organic nitrate broth. | | | | No nitrites detected. |
| Inorganic nitrate broth. | | | | No nitrites detected. |
| Peptone iron agar. | | | | No $H_2S$ produced. |
| Calcium malate plates. | No growth | | | |
| Emerson's | Moderate | Moderate; gray | Light brown | Reverse grayish-brown. |
| Hickey & Tresner's. | do | do | Lacking | Dark gray to black. |
| Gauze's Medium No. 1. | Poor, very thin | Poor; dull white to gray. | do | Reverse whitish. |
| Pridham's | Moderate | Moderate; gray | do | Vegetative mycelium olive; reverse gray to black. Spores cylindrical with truncate ends, 1.0=1.3× 0.6µ. |

These results were obtained after 2 weeks growth at 28° C.

It is to be understood that for the production of the antibiotic complex BA–17039 (ABC) according to the present invention, limitation to the aforesaid organism is not intended. It is especially desired and intended to include mutants produced from this organism by various means such as irradiation with X-rays or ultraviolet light, treatment with nitrogen mustards, and the like.

For preparation of the new substance, a wide variety of fermentation media are satisfactory. A medium composed basically of a source of assimilable nitrogen, a source of carbohydrate, and a source of minerals is required. Satisfactory nitrogen sources include hydrolyzed casein of various types, soy bean meal, distiller's solubles, corn meal, nitrates, ammonium salts, urea, and the like. Suitable carbohydrate sources include corn starch, dextrose, lactose, dextrin, etc. The preceding materials frequently contain sufficient minerals to satisfy the mineral requirement of the organism without substantial addition of mineral components. A suitable aqueous nutrient medium as used, for example, in the instant invention contains by weight 1% glucose, 1.5% soybean meal, 0.5% distiller's solubles, 0.5% sodium chloride, 0.2% dibasic potassium phosphate and 0.1% calcium carbonate. The pH of the fermentation is most suitably maintained at about 7.0 to 7.2. After autoclaving and inoculating, the fermentation is carried out at a temperature usually between about 28° and about 30° C., with aeration. In the laboratory, Fernbach flasks, mechanically shaken to provide aeration and agitation, are suitable for propagation of the culture, while in the plant, standard fermentation vessels, familiar to those skilled in the art, equipped for submerged aerobic fermentation may be employed. Aseptic conditions should be maintained, of course, throughout the transfer of the inoculum and the growth of the organism.

The growth of the microorganism and antibiotic production usually reaches it maximum after about 48 to 72 hours at 30° C. However, the optimum fermentation time will vary with temperature, variation in the equipment used, rate of aeration, stirring, etc. A period of at least 24 hours is required in any case. Ordinarily, there is no advantage to fermentation periods in excess of about three days. The broths show some antibacterial activity against B. subtilis which may be used for following the progress of the fermentation.

After a satisfactory level of antibacterial activity has been attained, the active substance may be isolated from the filtered broth by means of water-immiscible organic solvents such as n-butanol at a pH range of 2 to 8. The extraction need not be limited to n-butanol, but other solvents such as ethyl acetate, methyl isobutyl ketone, and chloroform may be used. The volume of solvent is not critical, but about a half volume of solvent is appropriate and provides good recovery. The resulting butanol extract is concentrated azeotropically under reduced pressure to remove most of the solvent. The concentrate is thereafter extracted with chloroform, and the resulting solution is concentrated to dryness. The material thus obtained is a greyish-white glassy solid which is the antibiotic complex BA–17039 (ABC) of the present invention.

Antibiotic complex BA–17039 (ABC) and the aforesaid principles BA–17039(A), BA–17039(B) and BA–17039(C) isolated therefrom, are remarkably effective in treating a number of infections. They exhibit significant activity against a wide variety of microorganisms. They are particularly noteworthy in their action on Gram-positive organisms and their activity against HeLa cells in tissue culture. While they demonstrate some activity against Gram-negative organisms, this activity is generally of somewhat lower level.

The antibiotic and anti-tumor activity of the substances of the present invention may be seen in Table 2.

TABLE 2

Activity of BA–17039(A), BA–17039(B) and BA–17039(C)

| No. | Activity against B. subtilis | Activity against HeLa cells |
|---|---|---|
| BA–17039(A) | Moderate | High. |
| BA–17039(B) | High | None. |
| BA–17039(C) | Low | High. |

Table 3 illustrates the activity of BA–17039(A) and BA–17039(B) against a group of microorganisms which cause various diseases. These tests were conducted by seeding nutrient broth containing various concentrations of the pure antibiotics with the particular organism specified. The "minimum inhibitory concentration" (MIC) indicated in Table 3 is the minimum concentration of the respective antibiotic (in micrograms/milliliter) at which growth of the microorganism failed to occur.

TABLE 3

Antibacterial Activity of BA–17039(A) and BA–17039(B)

| Microorganism | MIC, mcg./ml. | |
|---|---|---|
| | BA–17039(A) | BA–17039(B) |
| Gram-positive: | | |
| Staphylococcus aureus | 12.5 | 0.19 |
| Staphylococcus aureus 400* | 50 | 6.25 |
| Streptococcus pyogenes | 25 | 0.19 |
| Diplococcus pneumoniae | 200 | 6.25 |
| Erysipelothrix rhusiopathiae | 1.56 | 0.78 |
| Streptococcus faecalis | 0.04 | 0.78 |
| Candida albicans | 12.5 | 1.16 |
| Gram-negative: | | |
| Proteus vulgaris | >200 | >200 |
| Pseudomonas aeruginoa | >200 | >200 |
| Salmonella typhosa | >200 | >200 |
| Escherichia coli | >200 | >200 |
| Klebsiella pneumoniae | >200 | >200 |
| Hemophilus pertussis | >200 | >200 |

*Staphylococcus aureus 400—a variant strain of Staphylococcus aureus. The notation > means "greater than."

The aforesaid crystalline principles BA–17039(A) and BA–17039(C) were also found to possess particularly pronounced tumor-inhibiting activity against human carcinoma cells (strain HeLa) grown in cell culture according to the procedure described by Rightsel et al. (Journal of Immunology, 76, 464–74, 1956). In this test, the activity of BA–17039(A) is detected at levels as low as 0.01 to 0.02 mcg. per cc. and BA–17039(C) at levels as low as 0.05 to 0.1 mcg./cc. At these concentrations there is extensive destruction of the tumor cells in vitro.

The active substance of the present invention was tested for anti-tumor activity against Crocker Sarcoma 180 in mice, hereinafter referred to as S–180, according to the procedure described by Reilly et al., Cancer Research, 13, No. 9, 684–7 (Sept. 1953). The active substance was also tested for anti-tumor activity against established adenocarcinoma, hereinafter referred to as Established CA–755, according to the procedure described by Gellhorn et al., Cancer Research, Supplement III, page 38 (1955). In both tests, the substance of the present invention exhibited pronounced activity as an anti-tumor agent. See Table 4.

TABLE 4

Antitumor Activity of BA–17039(A)

| Dose, mg./kg. | Number survived | Percent inhibition | Type of tumor |
|---|---|---|---|
| 0.4 | 4/6 | 75 | S–180. |
| 0.3 | 5/6 | 73 | S–180. |
| 0.3 | 9/10 | 74 | Ca–755. |
| 0.2 | 10/10 | 56 | Ca–755. |
| 0.4 | 8/10 | 86 | Est. Ca–755. |
| 0.3 | 10/10 | 79 | Est. Ca–755. |

It is to be understood that for the purpose of treatment of infections and malignancies with the valuable compounds of the present invention either the pure materials, or one of the crude forms may be employed. These include filtered fermentation broths, as produced, for example, by BA–17039, or solid or liquid concentrates prepared therefrom. Such preparations should be of sufficient potency to provide a daily dose equivalent to at least about 50 to 500 mcg. of the pure antibiotic selected per kilogram of body weight. For this purpose, preparations having an antibiotic concentration of at least about 0.0001% and preferably 0.0005% or higher, should be provided. For the administration to animals, a non-toxic carrier is, of course, selected. Toxicity for this purpose is defined as an adverse effect on the treated host at the level of ordinary use. Either liquid or solid pharmaceutical carriers may be employed, including water, aqueous ethanol, isotonic saline or glucose, starch, lactose, calcium phosphate, animal feed stuffs, or mixtures of various materials as occur in a filtered fermentation broth. Either oral or parenteral administration is satisfactory, although the parenteral route is perhaps preferable until a satisfactory regimen adapted to the patient is established. For this purpose, solutions or suspensions in water, oils, such as peanut oil or sesame oil, or other pharmaceutically acceptable solvents or vehicles may be employed. Solid preparations for extemporaneous dilution can be prepared containing various buffering agents, local anaesthetics, and other medicinal agents including antibiotics, hypnotics, analgesics, as well as inorganic salts to afford desirable pharmaceutical properties to the composition.

In the therapy of tumors, the active substance of this invention may be employed in combination with one or more other carcinostatic agents. For this purpose, compositions containing from 10 to 90% by weight of the substance of the present invention are useful. Known carcinostatic agents which may be employed in such combinations include the nitrogen-mustard type, 6-mercaptopurine, 8-azaguanine, urethane, 6-diazo-5-oxo-1-norleucine, azaserine, triethylenemelamine, mitomycin C, triethylenephosphoramide, 1,4 - dimethylsulfonyloxybutane, the carcinostatic folic acid analogs, ethyl carbamate, and the like.

The present invention embraces the process for growing *Streptomyces longisporus* subsp. *griseus* (ATCC 14697), Isolate BA-17039, under controlled conditions to produce antibiotic complex BA-17039 (ABC). The culture is grown submerged in an aqueous nutrient medium as hereinbefore described. The medium is adjusted to pH 7.0 and the broth sterilized. It is inoculated with 2 to 5% of a 40–60 hour old culture grown in the same medium. The fermentation is carried out at 28° to 30° C. with mechanical aeration for from about 48 to 72 hours. The progress of the fermentation is followed by the activity of the broth against *B. subtilis*.

After a satisfactory level of antibiotic activity has been obtained, the active substance may be isolated by procedures well known to those skilled in the art, as for example, by the procedure set forth hereinbefore.

To further purify and to resolve the crude concentrate BA-17039 (ABC) into three components, the residue is subjected to counter-current distribution in the system chloroform-ligroin-methanol-0.5% aqueous sodium chloride. Three fractions are obtained based on the optical density at 260 m$\mu$ and upon the activity of said fractions as illustrated in Table 5.

TABLE 5

*Separation by Counter-Current Distribution*

| Fraction No. | Optical density at 260 m$\mu$ | Biological activity |
|---|---|---|
| 1 | Low | Positive. |
| 2 | Medium | Do. |
| 3 | Very high | Negative. |

When fraction No. 1 is concentrated to dryness BA-17039 (A) is obtained as a pale yellow glassy solid. Further purification of this pale yellow glassy solid can be accomplished by recrystallization from acetone.

Pure BA-17039 (A) crystallizes from acetone solution as colorless needles. It exhibits a melting point of 185°–186° C. It is soluble in chloroform and methylene chloride, moderately soluble (1–5 mg./cc.) in the lower alcohols, acetone and ethyl acetate, and only slightly soluble in water. The material behaves essentially as a neutral substance. The compound produces a wine red color with alcoholic ferric chloride. No characteristic colors are obtained with concentrated sulfuric acid or with aqueous sodium hydroxide. Elemental analysis reveals approximately 53.0% carbon, 7.8% hydrogen and 13.0% nitrogen. The balance is accounted for by oxygen. A molecular weight of 537 is obtained by the Rast method. The calculated empirical formula for BA-17039 (A) is $C_{24}H_{41}O_9N_5$. The composition required for the calculated empirical formula is 53.0% carbon, 7.6% hydrogen and 12.9% nitrogen. The calculated molecular weight is 543. BA-17039 (A) is optically active with a specific extinction $[\alpha]_D^{25}$ of $+11.8°$ in chloroform. BA-17039 (A) shows only end absorption in the ultraviolet spectrum. It exhibits characteristic absorption maxima at the following wave lengths in the infrared region of the spectrum when measured on a potassium bromide pellet: 3350, 2925, 1740, 1635, 1510, 1440, 1410, 1345, 1325, 1250, 1192, 1153, 1112, 1078, 1002, 980, 958, 924, 912, 866, 855, 832 and 814 cm.$^{-1}$. The infrared absorption spectrum of BA-17039 (A) is shown in the accompanying drawing, FIGURE 1. BA-17039 (A) shows a moderate activity against gram-positive bacteria. It is lethal to HeLa cells in tissue culture at concentrations of 0.01–0.02 mcg./cc. Fraction No. 2 of the counter-current distribution process described hereinbefore when concentrated to dryness yields an essentially colorless glassy solid. For further purification of this solid, it is passed in benzene through a chromatographic column of silicic acid and cellulose powder (2:1) in benzene. The eluate contains only oily impurities. Thereafter, the column is eluated with a solvent mixture of benzene and chloroform (1:1). The eluate contains a component characterized by high activity against *B. subtilis*. This component is designated as BA-17039 (B). After the antibiotic activity is essentially all eluted, the column is thereafter further eluted with chloroform. The eluate contains a component characterized by high activity against HeLa cells in tissue culture. This component is designated as BA-17039 (C).

Further purification of BA-17039 (B) can be accomplished by concentrating the eluate designated as BA-17039 (B) to dryness and crystallizing from ether or acetone. Pure BA-17039 (B) crystallizes from acetone solution as large colorless rectangular tablets. It exhibits a melting point of 165–166° C. Elemental analysis reveals approximately 68.7% carbon and 8.2% hydrogen. The balance is accounted for by oxygen. A molecular weight of 326 is obtained by the Rast method. The calculated empirical formula for BA-17039 (B) is $C_{20}H_{28}O_5$. The composition required for the calculated empirical formula is 68.9% carbon and 8.1% hydrogen. The calculated molecular weight is 348. BA-17039 (B) is optically active with a specific extinction $[\alpha]_D^{20}$ of $+28.9°$ and exhibits characteristic absorption maxima at the following wave lengths in the infrared region of the spectrum when measured on a potassium bromide pellet: 3325, 2925, 2575, 1760, 1695, 1615, 1450, 1392, 1372, 1300, 1258, 1222, 1210, 1180, 1126, 1102, 1084, 1060, 1025, 1003, 970, 896, 842, 822, 798, 773, 722, 695 and 670 cm.$^{-1}$. The infrared absorption spectrum of BA-17039 (B) is shown in the accompanying drawing, FIGURE 2. BA-17039 (B) shows high activity against gram-positive bacteria. It is essentially non-reactive against HeLa cells grown in cell culture.

Eluate designated as BA-17039 (C) is concentrated to dryness to yield a colorless glassy solid. This material exhibits relatively low antibiotic activity. It is lethal to HeLa cells grown in tissue culture at concentrations of 0.05–0.1 mcg./cc.

The following examples are given by way of illustration and are not to be construed as a limitation of this invention, many variations of which are possible without departing from the spirit or scope thereof.

EXAMPLE I

A fermentation broth of the following composition is prepared, adjusted to pH 7.0 and sterilized:

|  | G./l. |
|---|---|
| Glucose | 10 |
| Soybean meal | 15 |
| Distiller's solubles | 5 |
| Sodium chloride | 5 |
| Dibasic potassium phosphate | 2 |
| Calcium carbonate | 1 |
| Tap water to volume. | |

Inoculum is prepared by transferring a slant of *Streptomyces longisporus* subsp. *griseus* (ATCC No. 14697) to a portion of this medium and incubating for about 48 hours at 28° C. on a rotary shaker. The main batch of medium is then inoculated with 5% by volume of the inoculum so prepared. The inoculated medium is incubated at 26°–30° C. with agitation and aeration at the rate of about one volume of air per volume of broth per minute. Progress of the fermentation is followed by testing samples of the broth against *B. subtilis*. After 65 hours, the fermentation is halted. A broth with high antibiotic activity and activity against HeLa cells in tissue culture is obtained.

EXAMPLE II

The fermentation broth obtained as described in Example I is filtered, and the filtrate is extracted at pH 4 with one-third volume of n-butanol. The solvent extract is concentrated under reduced pressure to remove most of the solvent, and the resulting concentrate is extracted several times with equal volumes of chloroform. Evaporation of the chloroform under reduced pressure leaves a greyish white glassy solid, complex BA–17039 (ABC). This material exhibits a high degree of activity against a variety of microorganisms and against human carcinoma cells (strain HeLa) in tissue culture.

EXAMPLE III

Complex BA–17039 (ABC) is subjected to counter-current distribution in the system chloroform-ligroin-methanol-0.5% aqueous sodium chloride in the ratio (3:1:3:1). The complex is taken in 5–10 tubes in a 100 tube automatic apparatus. After one-hundred transfers, the tubes are combined as follows:

| Tubes | Fraction No. | Optical density at 260 mμ | Biological activity |
|---|---|---|---|
| 0–15 | 1 | Low | Positive. |
| 16–45 | 2 | Medium | Do. |
| 46–70 | 3 | Very high | None. |

Fraction No. 1 as herein obtained is concentrated to dryness. A pale yellow glassy solid is obtained which is recrystallized from acetone as colorless needles. The product, BA–17039 (A) has a melting point of 185°–186° C. and a molecular weight of 537 by the Rast method and exhibits a high degree of activity again HeLa cells grown in tissue culture, and a moderate activity against a variety of microorganisms. Elemental analysis shows 53.0% carbon, 7.8% hydrogen and 13.0% nitrogen. BA–17039 (A) gives a wine red color with alcoholic ferric chloride. It shows only end absorption in the ultraviolet. The characteristic infrared absorption spectrum is shown in FIGURE 1; the characteristic absorption maxima are tabulated hereinbefore.

The pure compound demonstrates antibacterial activity as shown hereinbefore. When tested against human uterine carcinoma cells (strain HeLa) grown in tissue culture, the compound causes extensive destruction of the tumor cells at levels of 0.01–0.02 mcg./ml.

EXAMPLE IV

Fraction No. 2 as obtained by the counter-current distribution process of Example III is evaporated to dryness to produce an essentially colorless glassy solid. This material is put on a chromatographic column of silicic acid-cellulose powder (2:1) in benzene solvent. The eluate contains oily impurities. Thereafter, the column is eluted with a solvent mixture of benzene-chloroform (1:1). The eluate contains BA–17039 (B). After the antibiotic activity is essentially all eluted, the column is thereafter further eluted with chloroform. This eluate contains BA–17039 (C).

Eluate containing BA–17039 (B) is concentrated to dryness and recrystallized from acetone as large colorless rectangular plates. The product, BA–17039 (B) has a melting point of 165°–166° C. and a molecular weight of 348 by the Rast method. The compound exhibits a high degree of activity against a variety of microorganisms. Elemental analysis shows 68.7% carbon and 8.2% hydrogen. The characteristic infrared absorption spectrum of BA–17039 (B) is shown in FIGURE 2; the characteristic absorption maxima are tabulated hereinbefore.

EXAMPLE V

The eluate of Example IV containing BA–17039 (C) is concentrated to dryness to yield a colorless glassy solid, product BA–17039 (C). This material exhibits relatively low antibiotic activity. It is lethal to HeLa cells grown in tissue culture at levels of 0.05–0.1 mcg./ml.

What is claimed is:

1. A process for the production of an antibiotic complex which comprises cultivation under submerged aerobic conditions of *Streptomyces longisporus* subsp. *griseus* in an aqueous nutrient medium comprising a source of assimilable nitrogen, a source of carbohydrate and a source of minerals until substantial antibiotic activity is imparted to said medium.

2. A process as set forth in claim 1 wherein the antibiotic complex is recovered from the fermentation broth.

3. A process for the production and recovery of an antibiotic complex and the separation of the three active components thereof which comprises cultivating *Streptomyces longisporus* subsp. *griseus* in an aqueous nutrient medium under submerged aerobic conditions until substantial antibiotic activity is imparted to said medium, extracting the antibiotic complex therefrom with a solvent, rendering said complex substantially free of solvent, subjecting said complex to counter-current distribution in the system chloroform-ligroin-methanol-0.5% aqueous sodium chloride in the ratio 3:1:3:1 by volume, evaporating the first fraction of said counter-current distribution to obtain a pale yellow glassy solid antibiotic substance, evaporating the second fraction of said counter-current distribution and subjecting said fraction to chromatography on a column of silicic acid-cellulose powder (2:1) in benzene followed by a benzene-chloroform mixture (1:1), evaporating said mixture to obtain a colorless crystalline antibiotic substance; thereafter eluting further the chromatographic column with chloroform, evaporating said chloroform solution to obtain a colorless glassy solid active substance.

4. An antibiotic product selected from the group consisting of an antibiotic which in purified form crystallizes from acetone as colorless needles which melt at 185–186° C.; which is soluble in chloroform and methylene chloride, moderately soluble in the lower alcohols, acetone and ethyl acetate and only slightly soluble in water; which substance produces a wine red color with alcoholic ferric chloride and which has substantially the following elemental analysis: 53.0% carbon, 7.8% hydrogen and 13.0% nitrogen, the balance being oxygen, and a molecular weight of approximately 537, optical activity with a specific extinction $[\alpha]_D^{25}$ of $+11.8°$; and which substance exhibits characteristic absorption maxima in the infrared region of the spectrum when measured on a potassium bromide pellet at 3350, 2925, 1740, 1635, 1510, 1440, 1410, 1345, 1325, 1250, 1192, 1153, 1112, 1078, 1002, 980, 958, 924, 912, 866, 855, 832 and 814 cm.$^{-1}$; and an antibiotic which in purified form crystallizes from acetone as colorless large rectangular tablets which melt at 165–166° C.; which substance has substantially the following elemental analysis: 68.7% carbon, 8.2% hydrogen and the balance being oxygen, and a molecular weight of approximately 326, optical activity with a specific extinction $[\alpha]_D^{20}$ of $+28.9°$; and which substance exhibits absorption maxima in the infrared region of the spectrum when measured on a potassium bromide pellet at 3325, 2925, 2575, 1760, 1695, 1615, 1450 1392, 1372, 1300, 1258, 1222, 1210, 1180, 1126, 1102, 1084, 1060, 1025, 1003, 970, 896, 842, 822, 798, 773, 722, 695 and 670 cm.$^{-1}$.

5. An antibiotic product which in purified form crystallizes from acetone as colorless needles which melt at 185–186° C.; which is soluble in chloroform and methylene chloride, moderately soluble in the lower alcohols, acetone and ethyl acetate and only slightly soluble in water; which substance produces a wine red color with alcoholic ferric chloride and which has substantially the following elemental analysis: 53.0% carbon, 7.8% hydrogen and 13.0% nitrogen, the balance being oxygen, and a molecular weight of approximately 537, optical activity with a specific extinction $[\alpha]_D^{25}$ of $+11.8°$; and which substance exhibits characteristic absorption maxima in the infrared region of the spectrum when measured on a potassium bromide pellet at 3350, 2925, 1740, 1635, 1510, 1440, 1410, 1345, 1325, 1250, 1192, 1153, 1112, 1078, 1002, 980, 958, 924, 912, 866, 855, 832 and 814 cm.$^{-1}$.

6. An antibiotic product which in purified form crystallizes from acetone as colorless large rectangular tablets which melt at 165–166° C.; which substance has substantially the following elemental analysis: 68.7% carbon, 8.2% hydrogen and the balance being oxygen, and a molecular weight of approximately 326, optical activity with a specific extinction $[\alpha]_D^{20}$ of $+28.9°$; and which substance exhibits absorption maxima in the infrared region of the spectrum when measured on a potassium bromide pellet at 3325, 2925, 2575, 1760, 1695, 1615, 1450, 1392, 1372, 1300, 1258, 1222, 1210, 1180, 1126, 1102, 1084, 1060, 1025, 1003, 970, 896, 842, 822, 798, 773, 722, 695 and 670 cm.$^{-1}$.

7. The colorless glassy solid active substance obtained by the separation process as set forth in claim 3.

8. A pharmaceutical composition comprising a substance selected from the group consisting of the colorless needle-like antibiotic claimed in claim 5, the colorless rectangular tablet-like antibiotic claimed in claim 6, the colorless glassy solid active material claimed in claim 7, and mixtures of these three in a pharmaceutically acceptable carrier.

No references cited.